United States Patent [19]

Cristiani et al.

[11] Patent Number: 4,971,291

[45] Date of Patent: Nov. 20, 1990

[54] ELECTROMAGNETIC FUEL METERING AND ATOMIZING VALVE

[75] Inventors: Marcello Cristiani, Imola; Massimo Lolli, Bologna, both of Italy

[73] Assignee: Weber S.r.l., Turin, Italy

[21] Appl. No.: 513,052

[22] Filed: Apr. 10, 1990

Related U.S. Application Data

[63] Continuation of Ser. No. 370,344, Jun. 22, 1989, abandoned.

[30] Foreign Application Priority Data

Jun. 23, 1988 [IT] Italy ................................ 67590 A/88

[51] Int. Cl.[5] ........................ F16K 31/06; F02M 51/00

[52] U.S. Cl. ........................... 251/129.22; 251/129.15; 239/585

[58] Field of Search ....................... 251/129.15, 129.22; 239/585

[56] References Cited

U.S. PATENT DOCUMENTS

| | | | |
|---|---|---|---|
| 3,913,537 | 10/1975 | Ziesche et al. | 239/585 X |
| 4,007,880 | 2/1977 | Hans et al. | 239/585 |
| 4,179,069 | 12/1979 | Knapp et al. | 239/585 |
| 4,416,423 | 11/1983 | Krauss et al. | 239/585 |
| 4,471,914 | 9/1984 | Hafner et al. | 239/585 |
| 4,477,027 | 10/1984 | Knapp et al. | 239/585 |
| 4,678,124 | 7/1987 | Hafner et al. | 239/585 |
| 4,717,079 | 1/1988 | de Concini | 251/129.15 X |
| 4,798,329 | 1/1989 | Mesenich | 239/585 X |
| 4,817,876 | 4/1989 | Hafner | 239/585 |
| 4,834,295 | 5/1989 | Cristiani et al. | 251/129.15 X |

FOREIGN PATENT DOCUMENTS

| | | | |
|---|---|---|---|
| 0232475 | 8/1987 | European Pat. Off. . | |
| 2553834A | 4/1985 | France . | |
| 60-6065 | 1/1985 | Japan . | |
| 0032973 | 2/1985 | Japan | 239/585 |
| 60-79154 | 4/1985 | Japan . | |
| 0240865 | 11/1985 | Japan | 239/585 |
| 60-261972 | 12/1985 | Japan . | |
| 0079859 | 4/1986 | Japan | 239/585 |
| 0079860 | 4/1986 | Japan | 239/585 |
| 62-162769 | 7/1987 | Japan . | |
| 2187332 | 9/1987 | United Kingdom . | |
| 2196181 | 4/1988 | United Kingdom . | |
| 2198589 | 6/1988 | United Kingdom . | |

*Primary Examiner*—John Rivell
*Attorney, Agent, or Firm*—Jeffers, Hoffman & Niewyk

[57] ABSTRACT

The present invention is a valve comprising a cylindrical supporting body having a first axial cavity housing an electromagnet and a core, and an axial hole communicating with the cavity and housing an anchor integral with a mobile plugging member; and a nozzle secured to the supporting body and in which is formed a fuel outlet hole controlled by the aforementioned plugging member. The supporting body presents a first and second series of holes designed to enable external communication, through the lateral surface of the supporting body, of the axial hole formed inside the body itself; the holes in one series being separated from those of the other in the direction of the body axis. The present invention provides for efficient metering and atomizing performance under all operating conditions.

3 Claims, 4 Drawing Sheets

ELECTROMAGNETIC FUEL METERING AND ATOMIZING VALVE

This is a continuation of application Ser. No. 370,344, filed Jun. 22, 1989, now abandoned.

BACKGROUND OF THE INVENTION

The present invention relates to an electromagnetic fuel metering and atomizing valve for an internal combustion engine fuel supply device. Known valves of the aforementioned type substantially comprise a cylindrical supporting body having a first axial cavity housing an electromagnet, and an axial hole communicating with said cavity and housing a core and an axially-sliding anchor integral with a mobile plugging member. Said valves also comprise a nozzle secured to and projecting axially from the supporting body, and in which is formed a fuel outlet hole communicating with said axial cavity and controlled by said plugging member. This is designed to move, by virtue of an electromagnet, between a first closed position wherein it is pushed by a spring against a seat on the nozzle, thus closing the fuel outlet hole, and an open position wherein the fuel outlet hole is opened. Said valves present a duct for feeding the fuel (piped to the valve) into a chamber communicating with said fuel outlet hole. Said fuel duct usually comprises an axial hole through the core and anchor on the valve, and further passages formed between further members and said supporting body and nozzle. On said valves, therefore, fuel is fed into said chamber along a duct originating at the top end and extending along the entire axial length of the valve.

A major drawback of known valves of the aforementioned type is the formation of the fuel vapours inside the fuel duct, which results in impaired operation of the valve in terms of metering and atomizing performance. This is particularly noticeable when operating with high-temperature fuel, as when the vehicle is left in the sun for prolonged periods of time.

Moreover, the pressure at which the fuel is fed into the chamber communicating with the fuel supply hole is not strictly constant, and rarely corresponds to the set pressure. As correct operation of the valve depends on the pressure of the fuel metered at each cycle being maintained strictly constant, the fuel supply circuit to the valve presents a pressure regulator for maintaining substantially constant fuel supply pressure. In the case of exceptionally long fuel ducts, however, between the upstream portion of the valve (controlled by said pressure regulator) and the chamber communicating with the fuel outlet hole, as on known valves of the aforementioned type, the pressure inside the chamber differs from that of said upstream portion due to the resistance encountered by the fuel in the duct portion formed inside the valve. Failure of such valves to provide for strictly constant fuel pressure, corresponding to the set pressure, immediately upstream from the fuel outlet hole, invariably results, as already stated, in impaired metering and atomizing performance. On certain known valves of the aforementioned type, the chamber formed inside the valve, immediately upstream from the fuel outlet hole, is supplied with fuel through holes formed inside a portion of the nozzle close to the chamber itself.

Though providing for substantially the same pressure inside the chamber and in the upstream portion of the valve (controlled by said pressure regulator) by reducing the length of the duct connecting the same, valves of the aforementioned type fail to provide a solution to the drawbacks caused by the formation of fuel vapours. Moreover, valves of this sort featuring fuel outlet holes on the nozzle involve fairly complex machining operations, thus resulting in high manufacturing cost of the valve as a whole.

SUMMARY OF THE INVENTION

The aim of the present invention is to provide an electromagnetic fuel metering and atomizing valve designed to overcome the drawbacks typically associated with known valves of the aforementioned type, i.e. a valve providing for efficient metering and atomizing performance under all operating conditions; which is of straight-forward design, and may be produced cheaply by virtue of involving no complex mechanical machining.

With this aim in view, according to the present invention, there is provided an electromagnetic fuel metering and atomizing valve for an internal combustion engine fuel supply device, said valve substantially comprising:

a substantially cylindrical supporting body having a first axial cavity housing an electromagnet and a core, and an axial hole communicating with said first cavity and housing an anchor integral with a mobile plugging member;

a nozzle secured to and projecting axially from said supporting body, and in which is formed an outlet hole communicating with said axial cavity and controlled by said plugging member;

said plugging member being moved, by virtue of said electromagnet, between a first closed position, wherein it is pushed by a spring against a seat on said nozzle, thus closing said outlet hole, and an open position wherein said outlet hole is opened; characterised by the fact that said body presents a first and second series of holes designed to enable external communication, through the lateral surface of said supporting body, of said axial hole formed inside said body; the holes in one said series being separated from those of the other in the direction of the axis of said body.

BRIEF DESCRIPTION OF THE DRAWINGS

Two non-limiting embodiments of the invention will be described by way of examples with reference to the accompanying drawings, in which.

DETAILED DESCRIPTION OF THE INVENTION

Figure 1:
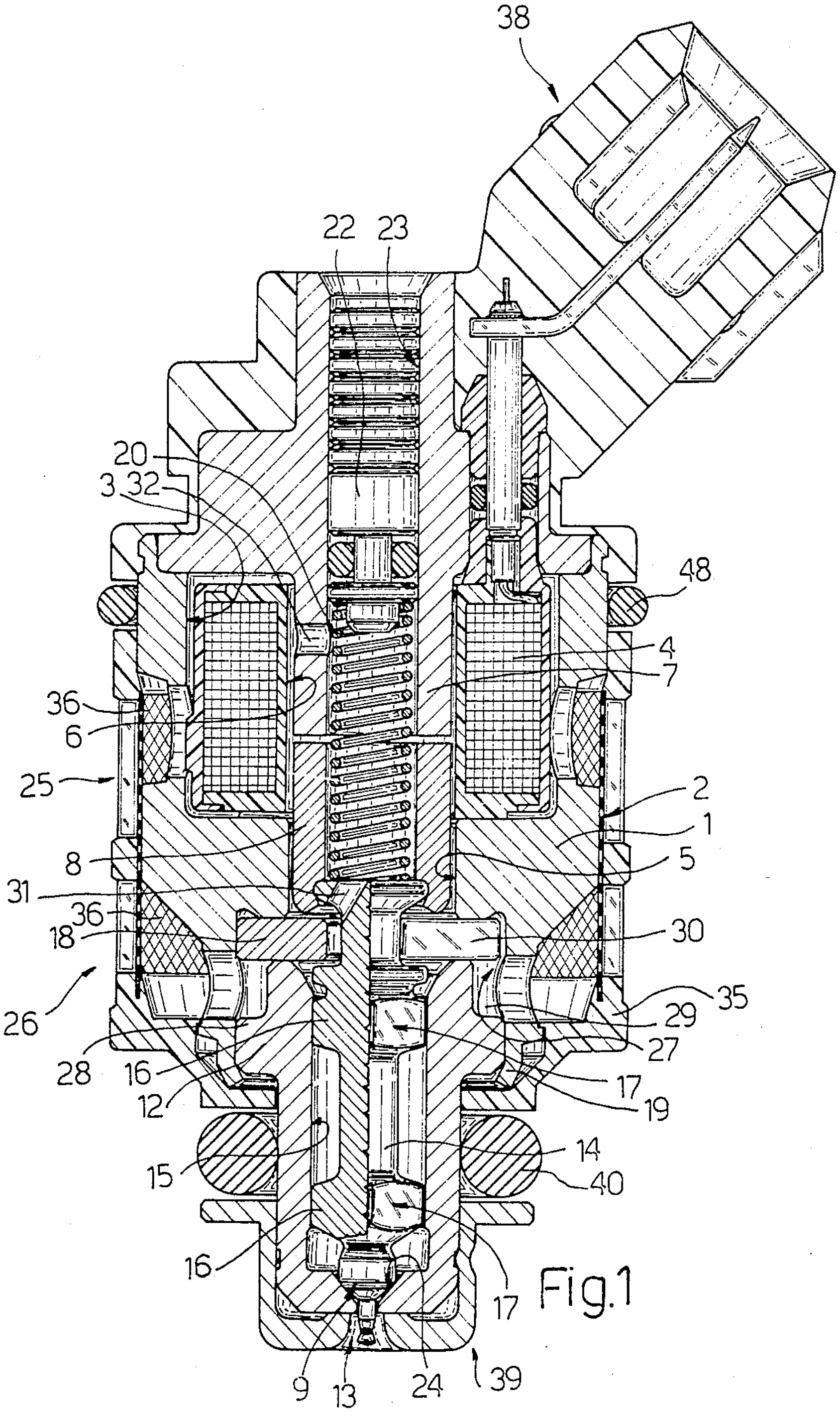
FIG. 1 shows an axial section of a first embodiment of the valve according to the present invention.

With reference to FIG. 1, the valve according to the present invention comprises a supporting body 1 defined by a substantially cylindrical lateral surface 2, and having a first axial cavity 3 housing an electromagnet 4, and an axial hole 5 communicating with said cavity 3. Axial hole 6 on electromagnet 4 houses a core 7, while axial hole 5 houses an axially-sliding anchor 8 integral with a mobile plugging member 9. Supporting body 1 is fitted with a nozzle 12 in which is formed a fuel outlet hole 13 controlled by plugging member 9. In the FIG. 1 embodiment, plugging member 9 is conveniently integral with a rod 14 sliding axially inside a cylindrical seat 15 on nozzle 12, and guided by a pair of annular projections 16 on which are formed flat portions 17, each defining a fuel passage together with the cylindrical surface of seat 15. A spacer 18 is fitted between nozzle 12 and body 1, and nozzle 12 is secured to body 1 by permanently deforming the annular end edge 19 of body 1.

Anchor 8 is substantially tubular and secured to rod 14, e.g. by permanently deforming the end of anchor 8. Inside anchor 8 and core 7, there is fitted a helical spring 20 having one end resting on a push rod 22 force-fitted inside an axial hole 23 on core 7, and designed to normally maintain plugging member 9 against a seat 24 upstream from fuel outlet hole 13.

According to the present invention, supporting body 1 presents two series of holes 25, 26 designed to enable external communication of axial hole 5 through lateral surface 2 of body 1. The holes in said first series are separated from those of said second series in the direction of the axis of body 1.

As shown in FIG. 1, the holes in said first series 25 consist of radial holes coming out inside cavity 3 of body 1; while those of said second series 26 consist of radial holes coming out inside a second axial cavity 27 on body 1, housing the top end of nozzle 12 and spacer 18.

The top end of nozzle 12 presents an annular projection 28 defining, together with axial cavity 27, an annular fuel chamber 29 inside which the holes of said second series 26 come out. Spacer 18 also presents a slot 30 for connecting chamber 29 to axial hole 5, to seat 15 inside nozzle 12 and, consequently, to fuel outlet hole 13.

The end of rod 14 presents at least one hole 31 for connecting the hole in anchor 8 to seat 15 of nozzle 12.

As shown in FIG. 1, body 1 and part of nozzle 12 are conveniently covered by a plastic casing 35 having holes corresponding with those of said first and second series 25 and 26. Between cover 35 and body 1, there is provided a mesh filter 36. The valve also comprises known electrical connecting members 38 for supplying electromagnet 4, a cap 39 for nozzle 12, and a sealing ring 40.

Figure 2:
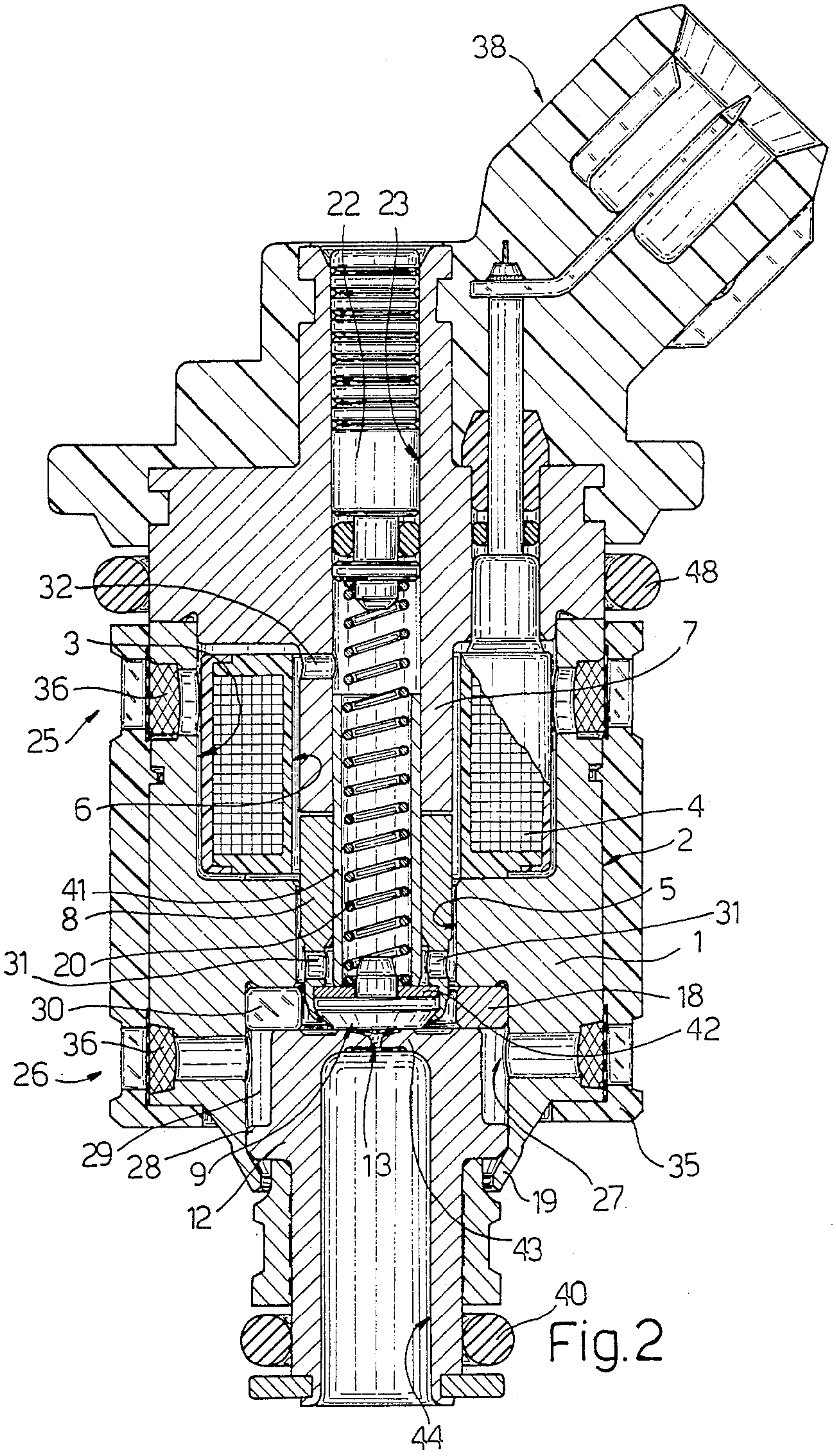
FIG. 2 shows an axial section of a second embodiment of the valve according to the present invention.

The FIG. 2 embodiment differs from that of FIG. 1 solely as regards the design of nozzle 12 and plugging member 9, which, in this case, is in the form of a plate.

All the other component parts on the valve are therefore indicated using the same numbering system as in FIG. 1. As shown in FIG. 2, plate 9 is integral with anchor 8, which is guided by a coupling 41 fitted inside the axial hole on core 7. A ring 42 is conveniently provided between anchor 8 and plate 9.

Fuel outlet hole 13 is formed inside top wall 43 of nozzle 12 and comes out inside an axial hole 44 on the same. The FIG. 2 embodiment also presents two series of holes 25, 26, the first series 25 coming out inside cavity 3 in body 1, and the second series 26 inside annular chamber 29 formed between nozzle 12 and cavity 27 in body 1.

The valve according to the present invention operates as follows.

Figure 3:
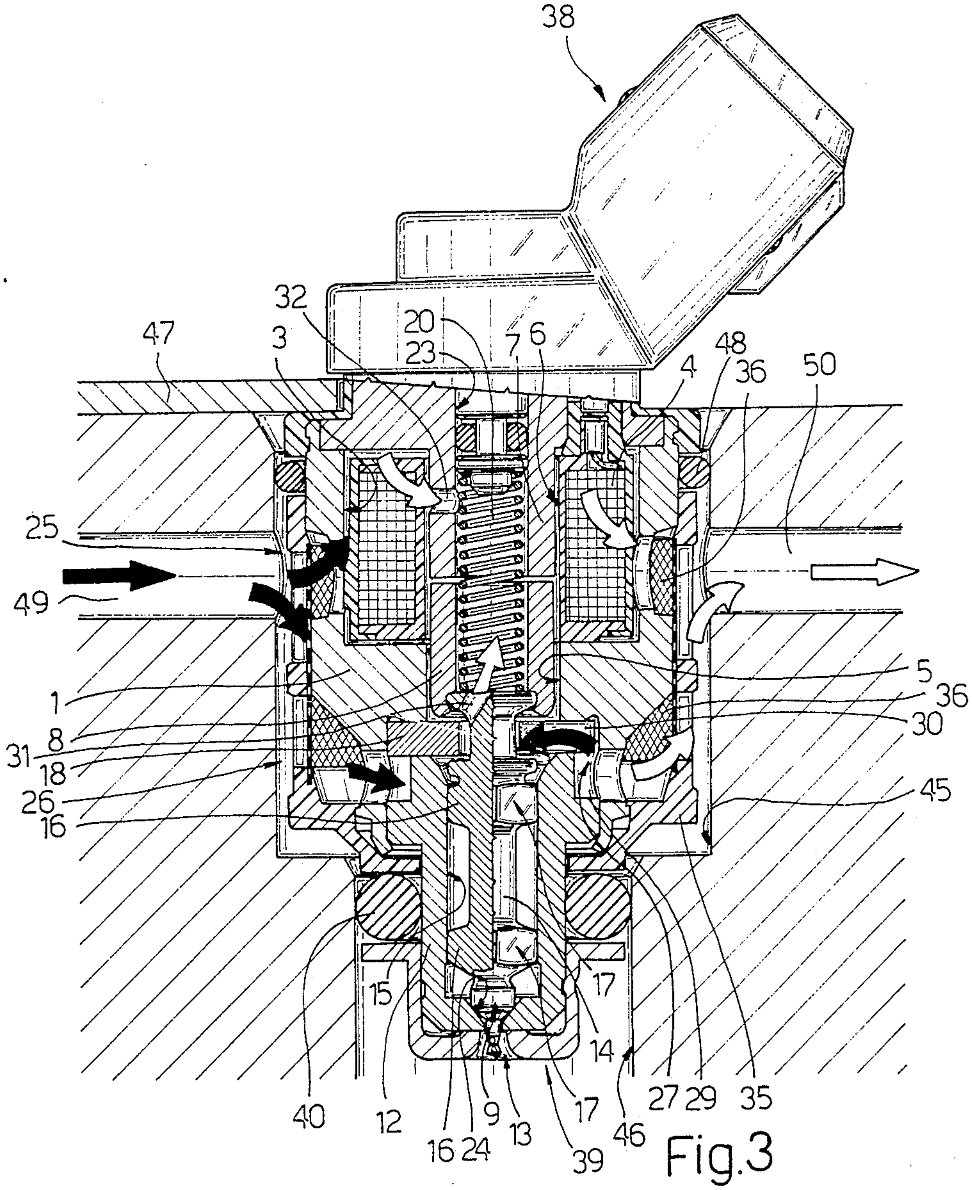
FIGS. 3 and 4 show sections of the FIG. 1 valve on the fuel supply circuit to the same.

When connected to a fuel circuit of the type shown in FIG. 3, the valve according to the present invention is housed inside a substantially cylindrical seat 45 having a hole 46 communicating with the manifold supplying the mixture to the engine. As shown in FIG. 3, when the valve is housed and locked inside seat 45, e.g. by means of plate 47, pressure is exerted on the surface of hole 46 by sealing ring 40 which, together with a further sealing ring 48 between the valve and seat 45, seals the fuel inside seat 45. Fuel is fed into seat 45 along a duct 49 preferably located in line with said first series of holes 25, and is drained from seat 45 by a further duct 50.

The fuel supplied by duct 49 is maintained at a predetermined pressure by a pressure regulator (not shown) on the fuel circuit upstream from duct 49. The incoming fuel from duct 49 therefore fills seat 45 and enters the valve through both series of holes 25 and 26, as shown by the black arrows in FIG. 3. A first stream of fuel through holes 25 flows into annular chamber 29 immediately upstream from outlet hole 13, and into seat 15 on nozzle 12 through slot 30 in spacer 18 and the cavities formed between the flat portions of annular projections 16 and the surface of seat 15.

A second stream of fuel through holes 25 flows into cavity 3 housing electromagnet 4, and, via the openings between core 7, anchor 8 and the surfaces of hole 5 in body 1 and hole 6 in electromagnet 4, flows over the outer surfaces of all the members inside cavity 3 and axial hole 5, and out along duct 50. The presence of radial hole 32 in core 7 facilitates said passage. Part of the fuel in said first stream through holes 26 may also flow through hole 31 in rod 14 of plugging member 9 into the axial holes on anchor 8 and core 7.

Said first stream of fuel through holes 26 therefore substantially supplies outlet hole 13 along said route inside the valve, the reduced length and, consequently, reduced resistance of which provide for minimal load losses, so that the fuel at outlet hole 13 presents substantially the same pressure as inside supply duct 49. Moreover, said second stream of fuel through holes 25 flows through all the openings and holes inside body 1, particularly those at the top of the valve, thus providing for effective scavenging of any vapours formed inside the same.

The valve according to the present invention has been found to overcome the drawbacks typically associated with known substantially axial fuel feed type valves, wherein the metering and atomizing efficiency of the valve is seriously impaired by the formation of vapours, particularly at the top of the valve. Moreover, metering and atomizing performance is improved by virtue of the high, substantially constant fuel pressure maintained immediately upstream from outlet hole 13.

Figure 4:
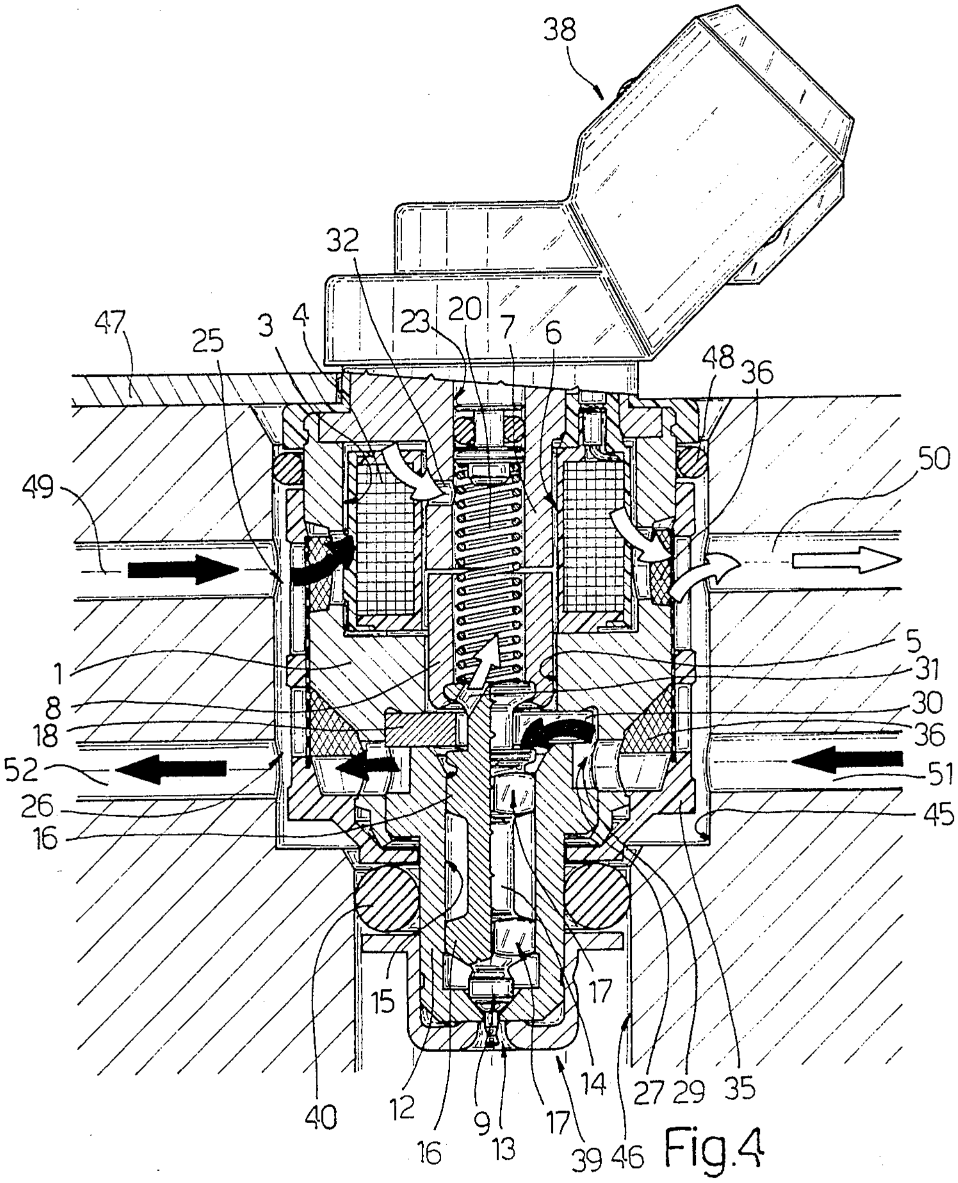

The valve according to the present invention may also be incorporated in a fuel circuit as shown in FIG. 4, which differs from the FIG. 3 circuit by presenting a further two ducts 51 and 52, of which duct 51 provides for supplying the valve with fuel through holes 26, and duct 52 for drainage. In this case, the fuel supply pressure along duct 51 is preferably higher than that of duct 49, so that duct 51 substantially provides for supplying fuel to outlet hole 13, and duct 49 for scavenging as described previously.

When electromagnet 4 is energized, anchor 8 is drawn towards core 7 against the action of spring 20, thus detaching plugging member 9 from seat 24 of nozzle 12 and so allowing a given quantity of fuel to flow through outlet hole 13. When electromagnet 4 is deenergized, spring 20 restores plugging member 9 to the closed position shown in the drawings.

The fuel circuits in FIGS. 3 and 4 are described with reference to the FIG. 1 embodiment of the valve according to the present invention. Needless to say, however, the same performance is also achieved using the FIG. 2 embodiment.

To those skilled in the art it will be clear that changes may be made to the valve as described and illustrated herein without, however, departing from the scope of the present invention.

What is claimed:

1. An electromagnetic fuel metering and atomizing valve for an internal combustion engine fuel supply device, said valve substantially comprising:

a substantially cylindrical supporting body having a first axial cavity housing an electromagnet and a tubular core, and an axial passage communicating with said first cavity and housing a tubular anchor integral with a mobile plugging member;

a nozzle secured to and projecting axially from said supporting body, and in which is formed an outlet hole, controlled by said plugging member, said plugging member being pushed by a spring against a seat on said nozzle thus closing said outlet hole;

a second axial cavity also communicating with said axial passage in which are housed a spacer ring and the top of said nozzle, abutting against said ring, said nozzle presenting an annular projection, defining, together with said second axial cavity and with said ring, an annular fuel chamber;

said tubular core being provided with a first axial hole in which is housed a push rod and a first half of said spring, and said tubular anchor being provided with a second axial hole in which is housed the second half of said spring;

said body presenting a first series of holes coming out inside said first cavity, and said core being provided with a first radial hole enabling communication between said first cavity and said first axial hole of said core, and said body further presenting a second series of holes separated from the holes of said first series in the direction of the axis of the body and coming out inside said annular fuel chamber, and said spacer ring having a radial slot connecting said annular chamber to said second axial hole provided in said anchor.

2. A valve as claimed in claim 1, in which said plugging member is integral with a rod sliding axially inside an axial hole in said nozzle and connected to said anchor, said annular chamber being connected to said axial passage by means of a hole provided in said rod.

3. A valve as claimed in claim 1, in which said plugging member comprises a plate designed to rest on a seat on said nozzle and so close said fuel outlet hole, said annular chamber being connected to said axial passage by means of a hole provided in said anchor.

* * * * *